US012365564B2

(12) United States Patent
Sukegawa et al.

(10) Patent No.: US 12,365,564 B2
(45) Date of Patent: Jul. 22, 2025

(54) NUMBER-OF-PEOPLE INFORMATION ACQUISITION SYSTEM, NUMBER-OF-PEOPLE INFORMATION ACQUISITION METHOD, AND ELEVATOR

(71) Applicant: Hitachi, Ltd., Tokyo (JP)

(72) Inventors: Yuta Sukegawa, Tokyo (JP); Takahiro Hatori, Tokyo (JP); Tomoaki Maehara, Tokyo (JP); Takahiro Okada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1087 days.

(21) Appl. No.: 17/297,625

(22) PCT Filed: Nov. 30, 2018

(86) PCT No.: PCT/JP2018/044137
§ 371 (c)(1),
(2) Date: May 27, 2021

(87) PCT Pub. No.: WO2020/110279
PCT Pub. Date: Jun. 4, 2020

(65) Prior Publication Data
US 2022/0024717 A1    Jan. 27, 2022

(51) Int. Cl.
*B66B 1/34*        (2006.01)
*B66B 1/24*        (2006.01)
(Continued)

(52) U.S. Cl.
CPC .......... *B66B 1/3476* (2013.01); *B66B 1/2408* (2013.01); *B66B 1/3484* (2013.01);
(Continued)

(58) Field of Classification Search
CPC ... B66B 1/3476; B66B 1/2408; B66B 1/3484; G06V 20/53
(Continued)

(56) References Cited

U.S. PATENT DOCUMENTS

2006/0065492 A1    3/2006  Trifu
2017/0327344 A1*  11/2017  Richmond ............ B66B 1/3476
(Continued)

FOREIGN PATENT DOCUMENTS

EP    1 930 276 A1    6/2008
EP    3 106 415 A1   12/2016
(Continued)

OTHER PUBLICATIONS

International Search Report (PCT/ISA/210) issued in PCT Application No. PCT/JP2018/044137 dated Mar. 5, 2019 with English translation (four (4) pages).
(Continued)

*Primary Examiner* — Erick D Glass
(74) *Attorney, Agent, or Firm* — Crowell & Moring LLP (57) ABSTRACT

In the present invention, a process of receiving an image obtained by capturing a measurement target place with a camera, calculating a number of people in the measurement target place based on the image received, and allocating a car according to the calculated number of people is performed. Here, when an abnormality that an image from the camera cannot be received is determined, a process of referring to a detection value of a sensor or the like installed in a car or in the measurement target place to calculate the number of people in the car or the measurement target place is performed.

10 Claims, 7 Drawing Sheets

(51) Int. Cl.
G06V 20/52 (2022.01)
H04N 7/18 (2006.01)

(52) U.S. Cl.
CPC ........ *G06V 20/53* (2022.01); *B66B 2201/222* (2013.01); *B66B 2201/23* (2013.01); *H04N 7/18* (2013.01)

(58) Field of Classification Search
USPC .......................................................... 187/247
See application file for complete search history.

(56) References Cited

U.S. PATENT DOCUMENTS

| | | | | |
|---|---|---|---|---|
| 2021/0107769 A1* | 4/2021 | Witczak | ................ | G06T 7/0004 |
| 2023/0162503 A1* | 5/2023 | Watanabe | ................ | H04N 5/92 |
| | | | | 348/143 |

FOREIGN PATENT DOCUMENTS

| | | |
|---|---|---|
| JP | 3-13467 A | 1/1991 |
| JP | 2001-80833 A | 3/2001 |
| JP | 2012-184080 A | 9/2012 |
| JP | 2013-230922 A | 11/2013 |
| JP | 2015-9909 A | 1/2015 |
| JP | 2015-202925 A | 11/2015 |
| JP | 2017-109846 A | 6/2017 |
| WO | WO 2007/034560 A1 | 3/2007 |

OTHER PUBLICATIONS

Japanese-language Written Opinion (PCT/ISA/237) issued in PCT Application No. PCT/JP2018/044137 dated Mar. 5, 2019 (four (4) pages).

Extended European Search Report issued in European Application No. 18941817.1 dated Jun. 29, 2022 (six (6) pages).

* cited by examiner

NUMBER-OF-PEOPLE INFORMATION ACQUISITION SYSTEM, NUMBER-OF-PEOPLE INFORMATION ACQUISITION METHOD, AND ELEVATOR

TECHNICAL FIELD

The present invention relates to a number-of-people information acquisition system, a number-of-people information acquisition method, and an elevator.

BACKGROUND ART

In an elevator system in which a plurality of elevator cars are installed adjacent to each other, it is necessary to appropriately control the operation of each elevator car according to the number of passengers in each elevator car, the number of people waiting at the landing, and the like. That is, by executing control so that the use statuses of the plurality of cars are substantially the same, it is possible to shorten the waiting time at the landing and improve the use efficiency of the entire elevator. For example, it is conceivable to control the operation of the elevator so as to preferentially stop a car with a small number of passengers when the car call button is pressed on any floor. In addition, since the number of people waiting at the landing where the car call button is pressed is known, it is possible to take measures such as stopping a plurality of cars in a case where the number of waiting people is large.

The number of passengers in each elevator car is calculated on the basis of an image captured by a camera installed in the car. In addition, the number of people waiting at the landing is calculated on the basis of an image captured by a camera installed at the landing.

Patent Literature 1 discloses a control system in which a camera (an image capturing device) is installed at an elevator landing, the congestion status (the population density) of the landing is calculated from an image captured by the camera, and the car is caused to stand by on the basis of the congestion status calculated.

CITATION LIST

Patent Literature

Patent Literature 1: JP 2017-109846 A

SUMMARY OF INVENTION

Technical Problem

Meanwhile, in a case where the number of passengers and the number of waiting people are detected from images captured by using a camera in a car or a camera at a landing, if images cannot be acquired due to failures of these cameras or the like, elevator control cannot be appropriately executed. That is, when the elevator operation management device cannot acquire images from the camera installed in the car, the number of passengers in each car cannot be grasped. In addition, when the elevator operation management device cannot acquire images from the camera installed at the landing on each floor, the number of people waiting at the landing on each floor cannot be grasped. If these situations occur, the elevator operation management device cannot appropriately execute elevator control according to the actual number of passengers.

An object of the present invention is to provide a number-of-people information acquisition system, a number-of-people information acquisition method, and an elevator capable of acquiring number-of-people information and continuously performing appropriate management even when a situation in which an image cannot be acquired from a camera occurs.

Solution to Problem

In order to solve the above problem, for example, the configuration described in the claims is adopted.

The present application includes a plurality of means for solving the above problem, and an example thereof is a number-of-people information acquisition system that includes a camera that captures a measurement target place, a reception unit that receives an image captured by the camera, a number-of-people setting unit that calculates a number of people in the measurement target place based on an image received by the receiving unit, an allocation command unit that allocates a car according to the number of people in the measurement target place calculated by the number-of-people setting unit, and an abnormality determination unit that determines an abnormality of the camera or a transmission path based on a reception status of an image in the reception unit.

When the abnormality determination unit determines an abnormality, the number-of-people setting unit refers to a detection value of a sensor installed in the car or the measurement target place to calculate the number of people.

According to the present invention, even in a case where an abnormality occurs in the camera or the transmission path, it is possible to determine the number of persons in the measurement target place and to appropriately allocate the car.

Problems, configurations, and effects other than those described above will be clarified by the following description of embodiments.

DESCRIPTION OF EMBODIMENTS

Hereinafter, an embodiment of the present invention will be described with reference to FIGS. 1 to 4.

[1. Configuration of Entire System]

Figure 1:
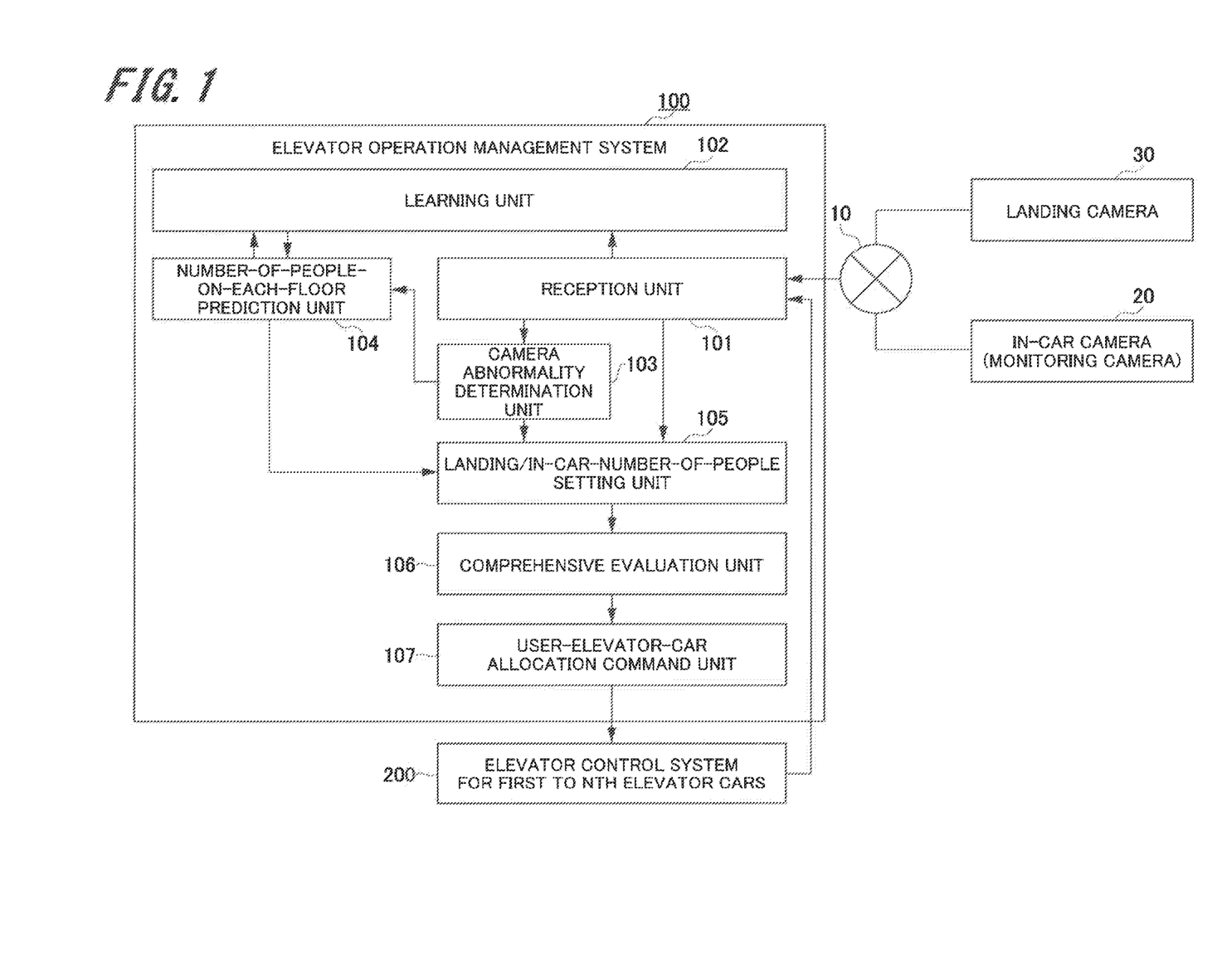
FIG. 1 is a system configuration diagram illustrating a configuration example of an entire system according to an embodiment of the present invention.

FIG. 1 is a diagram illustrating a configuration example of a system according to an embodiment of the present invention.

An embodiment of the present invention is applied to an elevator in which a plurality of elevator cars are arranged, and FIG. 1 illustrates a control configuration of the elevator.

Here, there are provided an elevator operation management system 100 that integrally controls the operation of the plurality of elevator cars and an elevator control system 200 that controls each elevator car according to an instruction from the elevator operation management system 100. The elevator control system 200 simultaneously controls the operation of a plurality of elevator cars from a first elevator car to an Nth elevator car (N is an integer of 2 or more).

The elevator operation management system 100 and the elevator control system 200 are disposed in, for example, a building in which an elevator is installed, and the elevator control system 200 controls a motor that drives each elevator car or the like. The elevator operation management system 100 and the elevator control system 200 are each configured with a computer device that performs arithmetic processing according to a program prepared in advance and generates a command or the like on the basis of the arithmetic processing result.

The elevator operation management system 100 illustrated in FIG. 1 is a functional block diagram in terms of functions performed by the elevator operation management system 100.

As illustrated in FIG. 1, the elevator operation management system 100 includes a reception unit 101, a learning unit 102, a camera abnormality determination unit 103, a number-of-people-on-each-floor prediction unit 104, a landing/in-car-number-of-people setting unit 105, a comprehensive evaluation unit 106, and a user-elevator-car allocation command unit 107.

The reception unit 101 performs a reception process of acquiring information regarding the control state of each elevator car in the elevator control system 200, and also performs a reception process of acquiring an image captured by an in-car camera 20 and an image captured by a landing camera 30. The information received by the reception unit 101 from the elevator control system 200 includes, in addition to information such as a traveling position (a hoisting position) of each elevator car, information regarding opening and closing of a door of an elevator car and information of a sensor attached to a car. Furthermore, the reception unit 101 also receives operation statuses of a call button installed at the landing on each floor, a stop floor button arranged on an operation panel in a car, and the like.

The information of a sensor set in a car includes information of a load sensor that detects the loading amount of the car.

Note that the in-car camera 20 is a monitoring camera that is attached to the ceiling or wall surface of each elevator car and performs a capturing process of acquiring an image obtained by capturing the entire inside of the car. The landing camera 30 is a camera that is installed at the landing on each floor where the elevator stops, and performs a capturing process of acquiring an image obtained by capturing the status of the entire landing on each floor. The real-time images captured by the cameras 20 and 30 are transmitted to the reception unit 101 via a transmission path 10.

The learning unit 102 performs a learning process of learning the number of passengers in each elevator car and the number of people waiting at the landing on each floor under various operation statuses of the elevator. In order to learn the number of people, the image received by the reception unit 101 and information regarding the number of people predicted by the number-of-people-on-each-floor prediction unit 104 are supplied to the learning unit 102. Note that the learning unit 102 learns only the number of people waiting at the landing on each floor, and does not have to learn the number of passengers in each elevator car.

Figure 2:
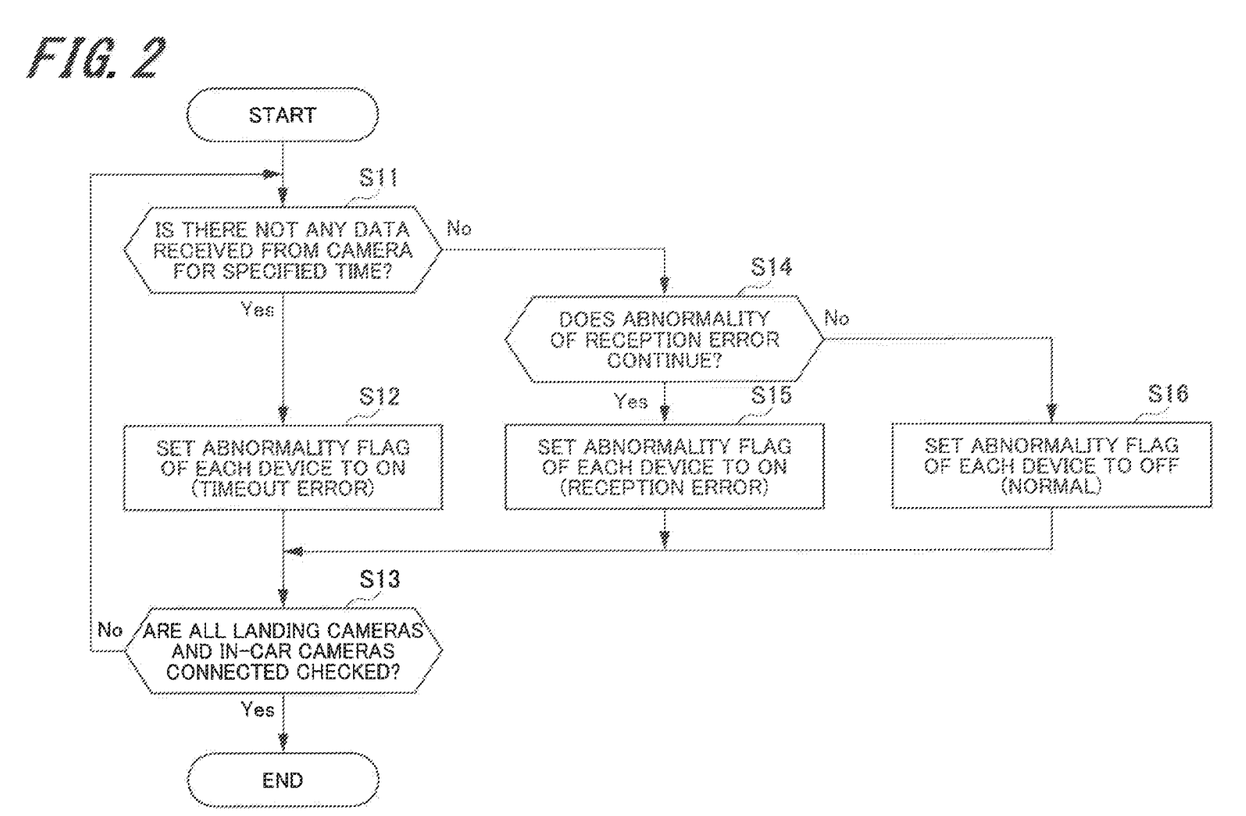
FIG. 2 is a flowchart illustrating an example of a camera abnormality determination process according to an embodiment of the present invention.

The camera abnormality determination unit 103 determines the abnormality of each of the cameras 20 and 30 on the basis of the reception status of the images that are captured by the respective cameras 20 and 30 and received by the reception unit 101. A specific example of determining as abnormal will be described later (FIG. 2). Note that, the case where the camera abnormality determination unit 103 determines that each of the cameras 20 and 30 is abnormal also includes an abnormality of the transmission path 10 through which the image captured by the camera is transmitted.

The information regarding the abnormality determination result in the camera abnormality determination unit 103 is transmitted to the number-of-people-on-each-floor prediction unit 104 and the landing/in-car-number-of-people setting unit 105.

The number-of-people-on-each-floor prediction unit 104 refers to the information regarding the number of people waiting at the landing on each floor in various statuses in the past learned by the learning unit 102, and predicts the current number of people waiting at the landing on each floor. That is, the number-of-people-on-each-floor prediction unit 104 acquires the number of waiting people learned in a similar status in the past that matches the current status (time, day of the week, weather, and the like) from the learning unit 102. The number-of-people-on-each-floor prediction unit 104 then refers to the acquired number of waiting people in the similar status in the past and predicts the current number of waiting people.

The landing/in-car-number-of-people setting unit 105 performs a number-of-people determination process of obtaining the number of passengers in each elevator car and the number of people waiting at the landing on each floor on the basis of the image received by the reception unit 101. That is, the landing/in-car-number-of-people setting unit 105 analyzes the image of the in-car camera 20 received by the reception unit 101 to recognize the head and body of the person, counts the number of recognized persons, and calculates the number of users in a car. Alternatively, the landing/in-car-number-of-people setting unit 105 analyzes the image of the landing camera 30 received by the reception unit 101 to recognize the head and body of the person, counts the number of recognized persons, and calculates the number of people waiting on the floor where the landing camera 30 is installed.

Moreover, in a case where the landing/in-car-number-of-people setting unit 105 obtains the information of the camera abnormality from the camera abnormality determination unit 103, the landing/in-car-number-of-people setting unit 105 sets the number of people predicted by the number-of-people-on-each-floor prediction unit 104 as the number of passengers in each elevator car or the number of people waiting at the landing on each floor.

The comprehensive evaluation unit 106 performs a process of comprehensively evaluating the number of people waiting at the landing on each floor and the number of passengers in each elevator car that are determined (calculated) by the landing/in-car-number-of-people setting unit 105 and allocating each elevator car.

The user-elevator-car allocation command unit 107 generates a command to allocate each elevator car on the basis of the result of allocation of each elevator car determined by the comprehensive evaluation unit 106, and transmits the command generated to the elevator control system 200.

The elevator control system 200 that has received the command from the user-elevator-car allocation command unit 107 executes traveling control to stop each elevator car on the floor based on the command.

[2. Camera Abnormality Determination Process]

FIG. 2 is a flowchart illustrating an example of a camera abnormality determination process in the camera abnormality determination unit 103.

First, the camera abnormality determination unit 103 determines whether the image data from any one of a plurality of cameras prepared (the in-car camera 20 and the landing camera 30) is not received by the reception unit 101 for a predetermined time (hereinafter, referred to as "specified time") (step S11). The specified time is defined as, for example, about several seconds to several tens of seconds.

When it is determined in step S11 that the image data is not received by the reception unit 101 for the specified time (Yes in step S11), the camera abnormality determination unit 103 sets the abnormality flag of the camera of the corresponding device (the elevator car or floor) to ON (step S12). Here, ON of the abnormality flag is ON of the abnormality flag due to a timeout error. After the abnormality flag is set to ON in step S12, the camera abnormality determination unit 103 proceeds to the determination in step S13.

Alternatively, when it is determined in step S11 that the image data is received by the reception unit 101 within the specified time (No in step S11), the camera abnormality determination unit 103 determines whether or not a reception error in which the reception of the image data from the corresponding camera fails continues a plurality of times (step S14). Here, in a case where the reception error in which the reception of the image data fails continues a plurality of times (Yes in step S14), the camera abnormality determination unit 103 sets the abnormality flag of the camera of the corresponding device (the elevator car or floor) to ON (step S15). ON of the abnormality flag is ON of the abnormality flag due to a reception error. After the abnormality flag is set to ON in step S15, the camera abnormality determination unit 103 proceeds to the determination in step S13.

Alternatively, in a case where the reception error in which the reception of the image data fails does not continue a plurality of times (No in step S14) in step S14, the camera abnormality determination unit 103 sets the abnormality flag of the camera of the corresponding device (the elevator car or floor) to OFF (step S16). The process of setting the abnormality flag to OFF corresponds to a process of determining that the corresponding camera is normal. After the abnormality flag is set to OFF in step S16, the camera abnormality determination unit 103 proceeds to the determination in step S13.

The camera abnormality determination unit 103 then determines whether or not all the in-car cameras 20 and the landing cameras 30 prepared are checked (step S13). When it is determined that the in-car camera 20 or the landing camera 30 that is not checked is present (No in step S13), the process returns to the determination in step S11, and the process of setting the abnormality flag in the in-car camera 20 or the landing camera 30 that is not checked is performed. Alternatively, when it is determined in step S13 that all the cameras are checked (Yes in step S13), one camera abnormality determination process ends.

The camera abnormality determination process illustrated in the flowchart of FIG. 2 is continuously and repeatedly performed while the elevator is operated.

[3. In-Car-Number-of-People Setting Process]

Figure 3:
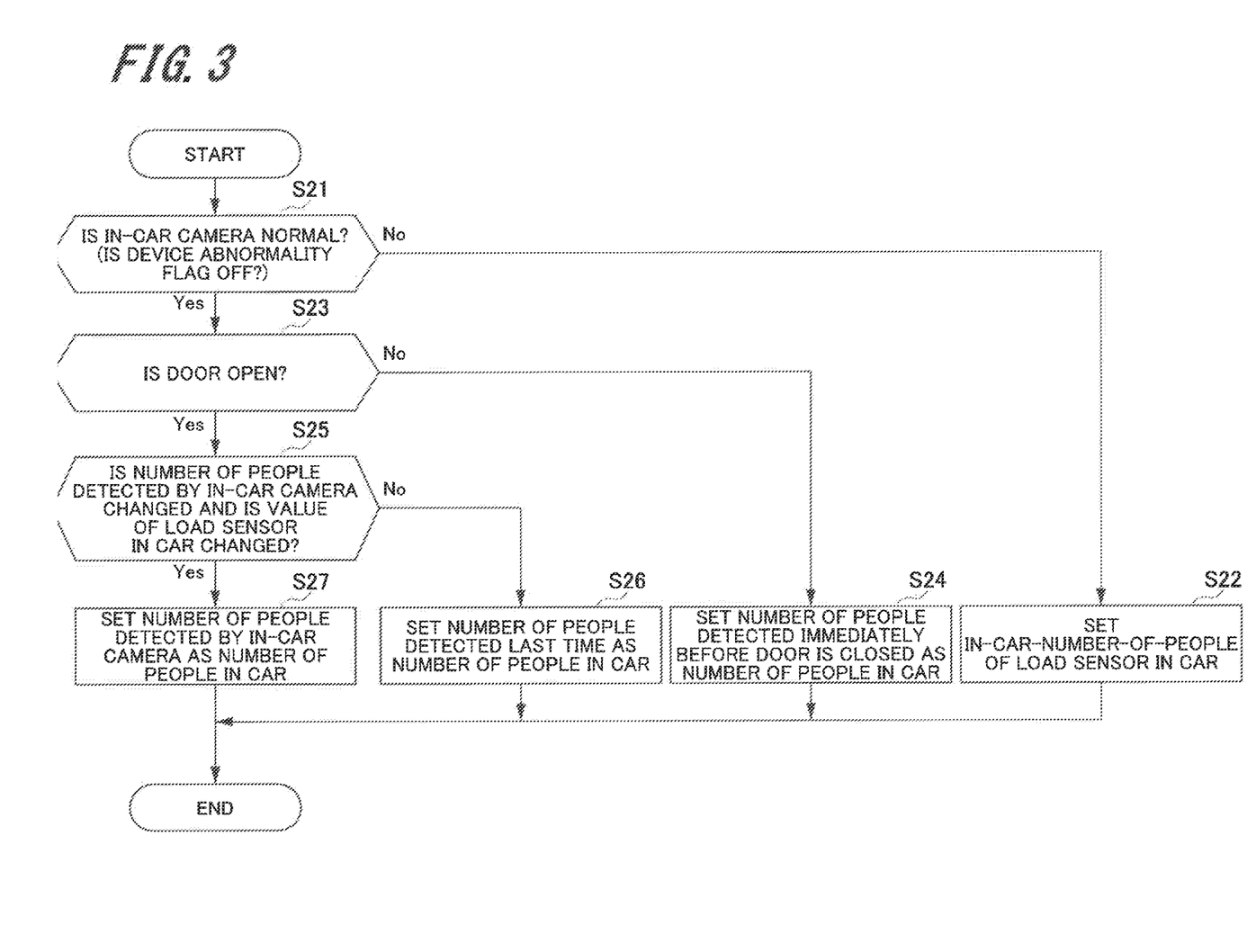
FIG. 3 is a flowchart illustrating an example of an in-car-number-of-people setting process according to an embodiment of the present invention.

FIG. 3 is a flowchart illustrating an example of an in-car-number-of-people setting process in the landing/in-car-number-of-people setting unit 105. The in-car-number-of-people setting process illustrated in FIG. 3 is performed in each elevator car.

First, the landing/in-car-number-of-people setting unit 105 refers to the abnormality flag of the in-car camera 20 of the corresponding elevator car to determine whether or not the in-car camera 20 is normal (step S21). Here, in a case where the abnormality flag is ON and the in-car camera 20 is abnormal (No in step S21), the landing/in-car-number-of-people setting unit 105 acquires a detection value of a load sensor in the corresponding car, and sets the number of users in the car on the basis of the detection value of the load sensor (step S22). At this time, the landing/in-car-number-of-people setting unit 105 sets a value obtained by dividing a weight value detected by the load sensor by the average weight of one person (for example, about 75 kg) as the number of users.

In a case where the abnormality flag is OFF and the in-car camera 20 is normal in step S21 (Yes in step S21), the landing/in-car-number-of-people setting unit 105 determines whether or not the corresponding elevator car stops on any floor and the door is open (step S23). Here, when it is determined that the door is closed (No in step S23), the landing/in-car-number-of-people setting unit 105 sets the number of users in the car, the number being determined immediately before the door of the corresponding car is closed, as the current number of users in the car (step S24).

Alternatively, when it is determined in step S23 that the door is open (Yes in step S23), the landing/in-car-number-of-people setting unit 105 determines whether or not the number of people detected on the basis of the image of the in-car camera 20 is changed and whether or not the detection value of the load sensor in the corresponding car is changed (step S25).

Here, in a case where the number of people detected on the basis of the image of the in-car camera 20 is not changed and the detection value of the load sensor in the corresponding car is not changed either (No in step S25), the landing/in-car-number-of-people setting unit 105 sets the number of users in the car determined last time as the current number of users in the car (step S26).

Alternatively, when it is determined in step S25 that the number of people detected on the basis of the image of the in-car camera 20 is changed and the detection value of the load sensor in the corresponding car is also changed (Yes in step S25), the landing/in-car-number-of-people setting unit 105 sets the number of people detected on the basis of the image of the in-car camera 20 as the current number of users in the car (step S27).

When the number of users in the car is set in steps S22, S24, S26, and S27, one in-car-number-of-people setting process ends. The in-car-number-of-people setting process illustrated in the flowchart of FIG. 3 is repeatedly performed in each car.

[4. Landing-Number-of-People Setting Process]

Figure 4:
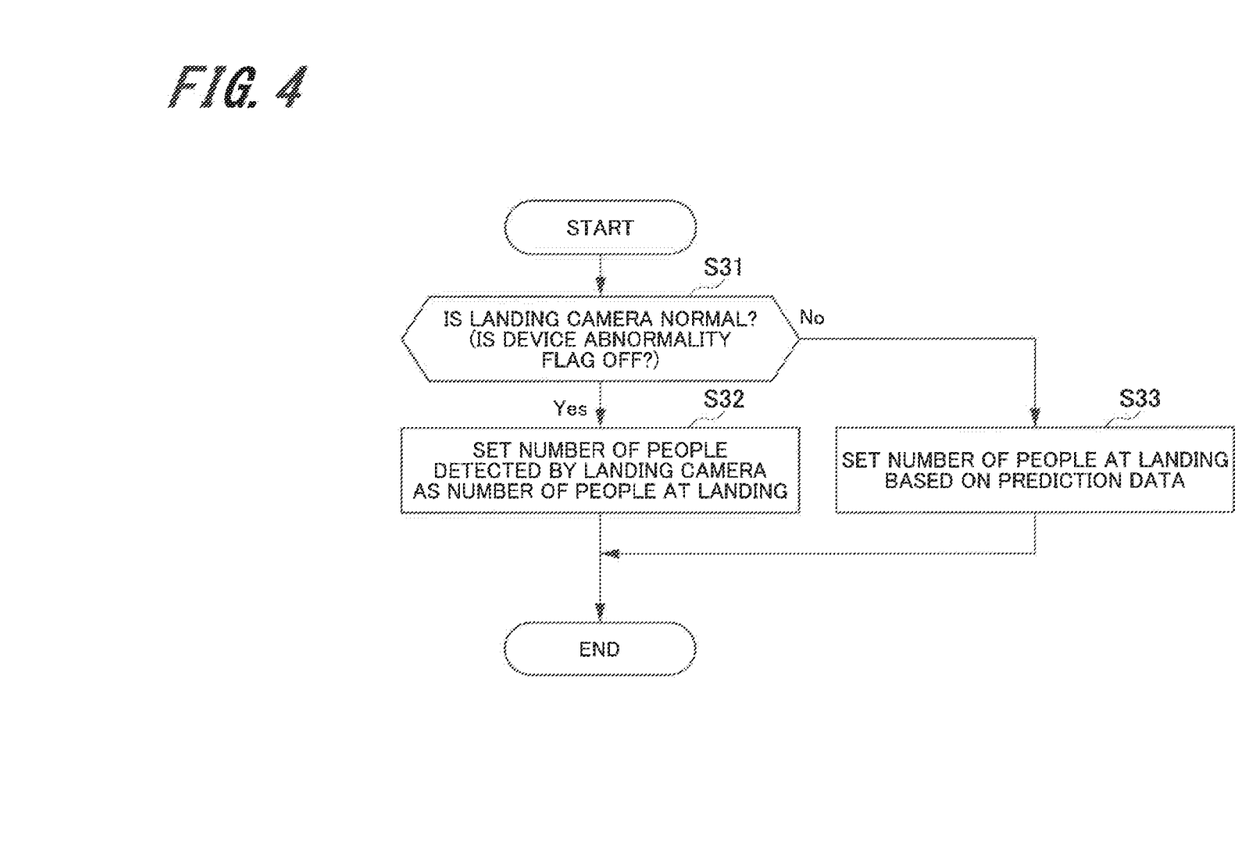
FIG. 4 is a flowchart illustrating an example of a landing-number-of-people setting process according to an embodiment of the present invention.

FIG. 4 is a flowchart illustrating an example of a landing-number-of-people setting process in the landing/in-car-number-of-people setting unit 105. The landing-number-of-people setting process illustrated in FIG. 4 is performed at the landing on each floor.

First, the landing/in-car-number-of-people setting unit 105 refers to the abnormality flag of the landing camera 30 on the corresponding floor to determine whether or not the landing camera 30 is normal (step S31). Here, in a case where the abnormality flag is OFF and the landing camera 30 is normal (Yes in step S31), the landing/in-car-number-of-people setting unit 105 sets the number of people detected by the image recognition of the image captured by the landing camera 30 as the number of people waiting at the landing (step S32).

Alternatively, when it is determined in step S31 that the abnormality flag is ON and the landing camera 30 is abnormal (No in step S31), the landing/in-car-number-of-people setting unit 105 sets the number of people predicted by the number-of-people-on-each-floor prediction unit 104 as the current number of people waiting at the landing (step S33). Note that the prediction by the number-of-people-on-each-floor prediction unit 104 is a prediction based on the learning result of the learning unit 102, and is a prediction that reflects the status of use in a building in which the corresponding elevator is installed.

When the number of people waiting at the landing is set in steps S32 and S33, one landing-number-of-people setting process ends. The landing-number-of-people setting process illustrated in the flowchart of FIG. 4 is repeatedly performed on each floor.

As described above, by performing the process of determining the number of passengers in each car of the elevator and the number of people at the landing on each floor, it is possible to appropriately determine the number of passengers in the car and the number of people at the landing even if the in-car camera 20 or the landing camera 30 is abnormal. Consequently, even if the in-car camera 20 or the landing camera 30 is abnormal or the transmission path 10 is abnormal, it is possible to appropriately allocate a plurality of cars.

For example, in a case where the image of the in-car camera 20 cannot be acquired, the number of passengers in the car is determined on the basis of the value of the load sensor installed in the car, and thus it is possible to accurately determine the number of passengers based on the actual load.

Furthermore, in a case where the image of the landing camera 30 cannot be acquired, the predicted number of people by the number-of-people-on-each-floor prediction unit 104, the number being obtained by referring to the learning result of the learning unit 102, is set as the number of people at the landing, and thus it is possible to accurately determine the number of people reflecting the status of use in the building where the elevator is installed. For example, in a case where the landing on the first floor is congested in a specific time zone of a specific day of the week, even if the learning unit 102 learns the status and an abnormality occurs in the landing camera 30 on the first floor, it is possible to predict the appropriate number of people at the landing from the status such as the day of the week and the time zone. Consequently, even if an abnormality occurs in the landing camera 30 or the transmission path 10 that transmits an image, it is possible to appropriately allocate a car so as to reflect the status of use at that time.

In addition, in a case where the in-car camera 20 is normal, the number of passengers is updated only when the door of the car is open and the value of the load sensor attached to the car changes, so that the number of passengers is not erroneously changed.

That is, in a case where the number of people is determined by analyzing the image captured by the in-car camera 20, the number of people may be erroneously determined due to a plurality of people overlapping in the image or the like. Here, in the case of the present embodiment, by setting the condition that the door is opened and the load sensor value changes as in the flowchart illustrated in FIG. 3, the number of people is not updated when the number of people does not change, and thus the possibility that the number of people is erroneously determined can be reduced.

[5. Modification (1: Example of Configuration Including Only in-Car Camera)]

Note that the system configuration illustrated in FIG. 1 illustrates a preferred example, and the present invention is not limited to the system configuration illustrated in FIG. 1.

Figure 5:
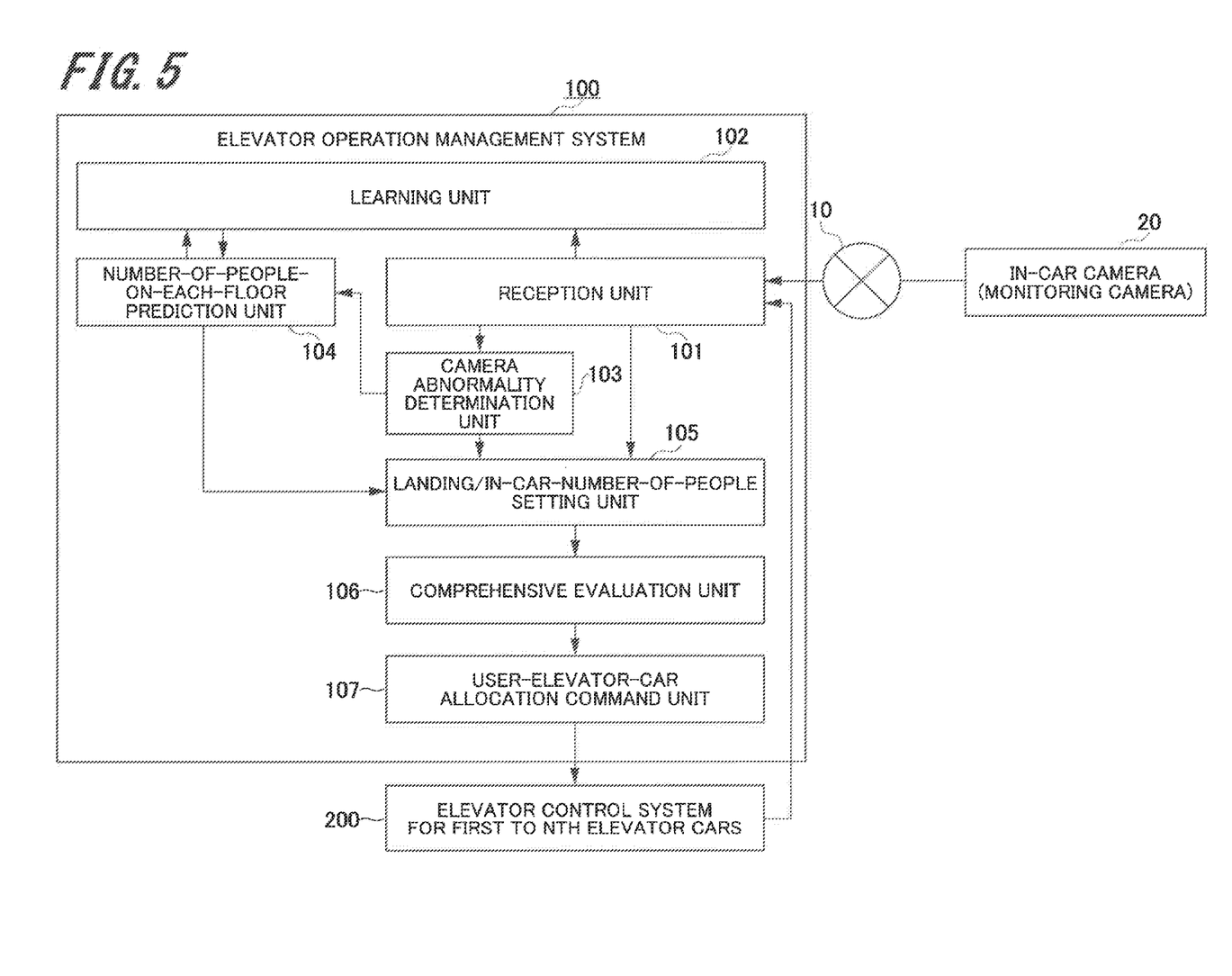
FIG. 5 is a system configuration diagram illustrating a configuration example of an entire system according to a modification of an embodiment of the present invention.

For example, the configuration illustrated in FIG. 1 is applied to an elevator system including both the in-car camera 20 and the landing camera 30. On the other hand, for example, as illustrated in FIG. 5, the configuration including only the in-car camera 20 may be applied to a system in which the image of the in-car camera 20 is used as a camera image received by the reception unit 101 and the landing camera 30 is omitted.

In this case, in a case where the image captured by the in-car camera 20 cannot be received due to some circumstances, in the embodiment described above, when the number of people is determined using the detection value of the load sensor, the number of people is determined by dividing the detection value of the load sensor by a predetermined average weight value per person. On the other hand, a more advanced determination may be made using the detection value of the load sensor and the learning result of the learning unit 102.

For example, in a case where it is determined from the learning result of the learning unit 102 that there is a time zone in which many children use, the average weight value per person at the time of calculation may be changed to a small value on the basis of the learning result to improve the accuracy of determining the number of people on the basis of the detection value of the load sensor.

Note that, even in the case of the configuration including both the in-car camera 20 and the landing camera 30 illustrated in FIG. 1, when the image captured by the in-car camera 20 cannot be acquired, the number of people in the car may be predicted similarly using the learning result of the learning unit 102.

[6. Modification (2: Example of Issuing to Outside when Abnormality Occurs in Camera)]

When an abnormality of the in-car camera 20 or the landing camera 30 is detected in the camera abnormality determination process illustrated in FIG. 2 described above, the camera abnormality detected may be issued (notified) to the outside.

Figure 6:
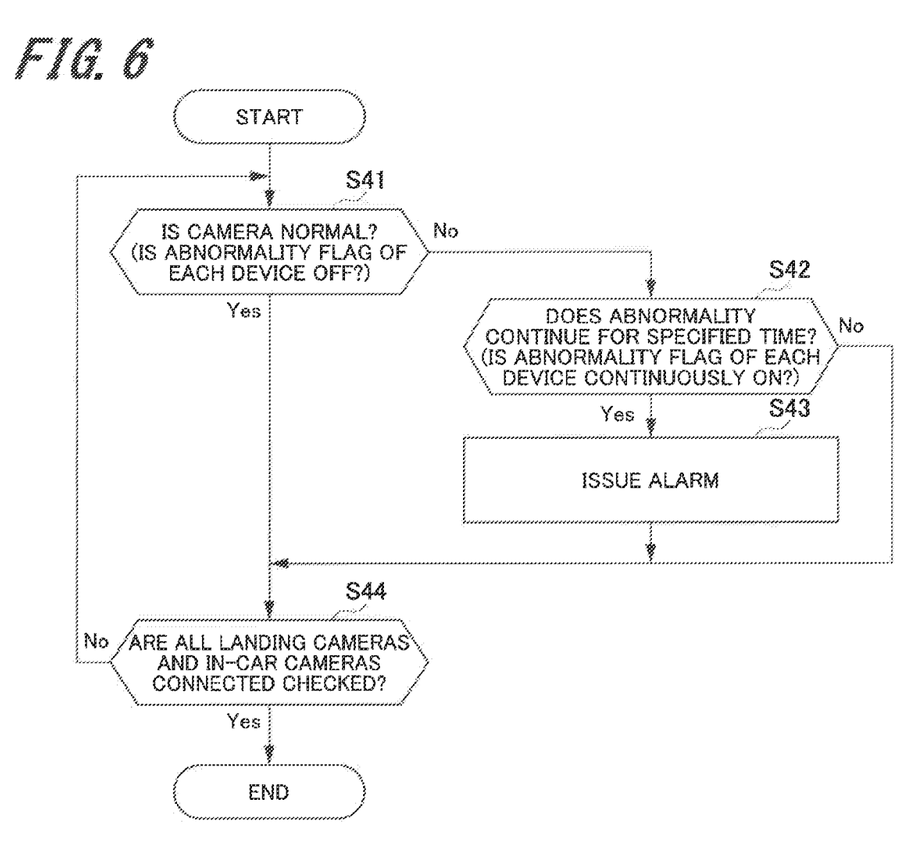
FIG. 6 is a flowchart illustrating an example of an issuing process when a camera abnormality is determined in the camera abnormality determination process according to an embodiment of the present invention.

The flowchart of FIG. 6 illustrates an example of a process of issuing a camera abnormality when the camera abnormality determination unit 103 of the elevator operation management system 100 detects a camera abnormality in the process described in the flowchart of FIG. 2.

Here, when detecting the abnormality of the in-car camera 20 or the landing camera 30 in the process described in the flowchart of FIG. 2, the camera abnormality determination unit 103 turns ON the abnormality flag of the corresponding camera. When the camera returns from an abnormal state to a normal state, the abnormality flag of the corresponding camera is turned OFF.

As illustrated in FIG. 6, the camera abnormality determination unit 103 determines whether or not the in-car camera 20 in each car or the landing camera 30 is normal (that is, whether or not the abnormality flag is OFF) (step 41).

When it is determined in step 41 that the abnormality flag of the corresponding camera is not OFF, that is, the abnormality flag is ON and a camera abnormality occurs (No in step 41), the camera abnormality determination unit 103 determines whether or not the abnormality continues for a specified time (step S42). It is determined in step S42 whether the state where the abnormality flag is ON continues for the specified time.

When it is determined in step S42 that the state where the abnormality flag is ON continues for the specified time (Yes in step S42), the camera abnormality determination unit 103 determines that the corresponding camera (either the in-car camera 20 or the landing camera 30) is abnormal and instructs to issue a camera abnormality signal (step S43).

Furthermore, when it is determined in step S41 that the abnormality flag of the corresponding camera is OFF (Yes in step S41), the camera abnormality determination unit 103 proceeds to the determination in step S44. Moreover, when it is determined in step S42 that the state where the abnormality flag is ON does not continue for the specified time (No in step S42), the camera abnormality determination unit 103 also proceeds to the determination in step S44.

In step S44, the camera abnormality determination unit 103 then determines whether or not all the cameras (the in-car cameras 20 and the landing cameras 30) in the system are checked (step S44).

When it is determined in step S44 that there is a camera that is not checked (No in step S44), the camera abnormality determination unit 103 returns to the process of step S41 and repeats the process for another camera. Alternatively, when it is determined in step S44 that all the cameras are checked (Yes in step S44), the camera abnormality determination unit 103 ends a camera abnormality signal issuing process.

Figure 7:
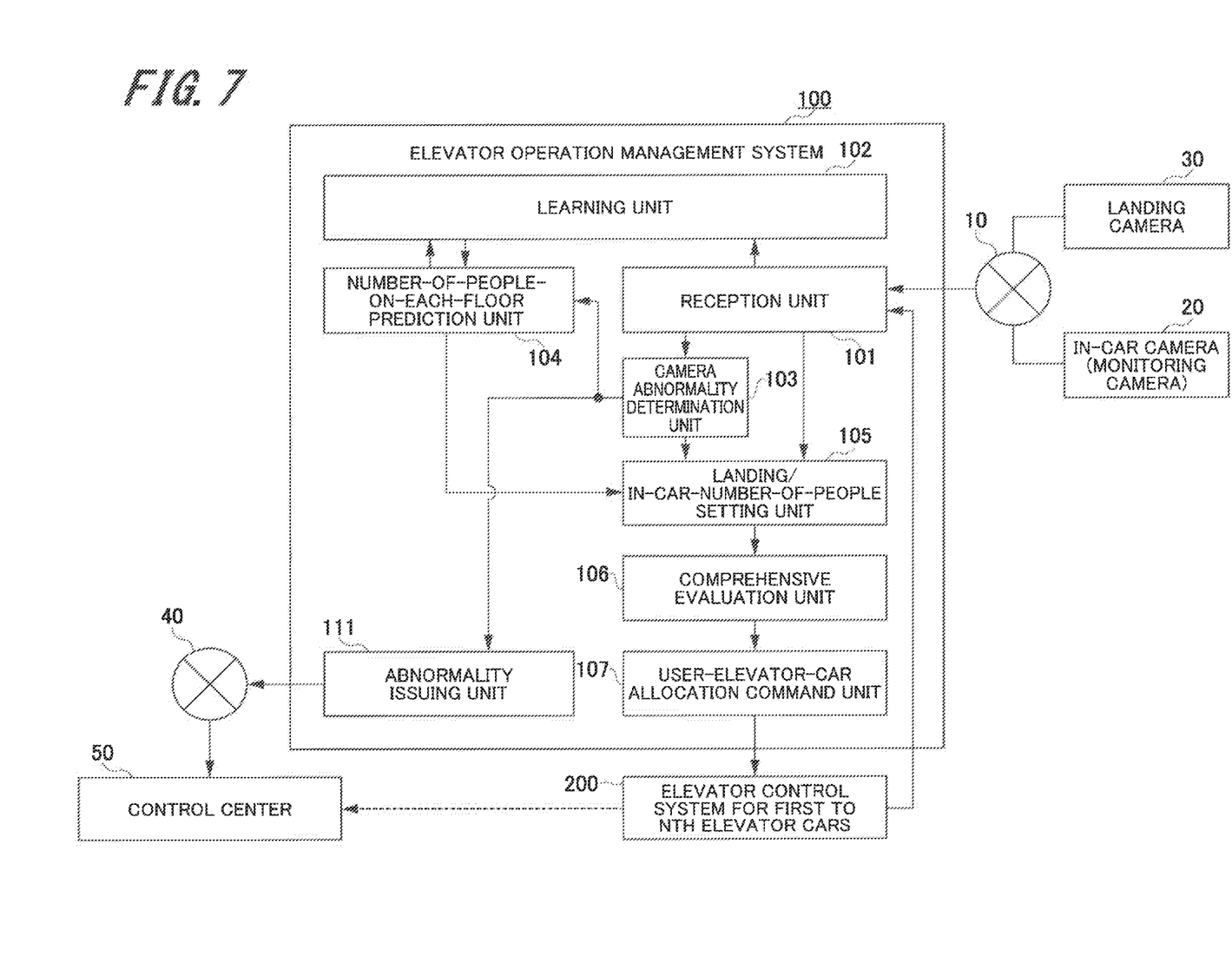
FIG. 7 is a system configuration diagram in a case where the issuing process at the time of the camera abnormality in FIG. 6 is performed.

FIG. 7 illustrates an example of a system configuration in a case where the camera abnormality signal issuing process illustrated in FIG. 6 is performed.

The elevator operation management system 100 includes an abnormality issuing unit 111. When the instruction to issue a camera abnormality signal is given from the camera abnormality determination unit 103, the abnormality issuing unit 111 issues a camera abnormality signal to a control center 50. The elevator operation management system 100 and the control center 50 are connected by a predetermined network 40. The network 40 is a network different from the network 10 that connects the elevator operation management system 100 and the cameras 20 and 30, but the same network may be used.

The control center 50 is a department in which the building manager manages the operation status of the elevator and the like, and includes a terminal device that displays the operation status of the elevator and the like. The control center 50 communicates with the elevator control system 200 to display the operation status of the elevator in real time and the like. The control center 50 is installed in, for example, a management department in a building, a disaster prevention center, or the like.

When the instruction to issue a camera abnormality signal is given in step S43 of the flowchart illustrated in FIG. 6, the abnormality issuing unit 111 issues (transmits) a camera abnormality signal to the control center 50. At this time, the identification code of the camera in which the abnormality is detected may be added. For example, ID:01 is given to the in-car camera of a first elevator car, ID:02 is given to the in-car camera of a second elevator car, . . . , ID:11 is given to the landing camera on a first floor, ID:12 is given to the landing camera on a second floor, . . . , so that individual codes are set. The identification code for distinguishing each camera is then attached, and the identification code (ID:XX) of the camera in which the abnormality is detected is added to the camera abnormality signal.

As such a camera abnormality signal is transmitted to the control center 50, the terminal device of the control center 50 displays the abnormality of the camera indicated by the identification code.

By issuing the camera abnormality signal to the control center 50 as described above, the control center 50 can notify the manager of the abnormality of any camera in the system, and can arrange the repair or recovery of the corresponding camera.

Alternatively, when the camera abnormality signal is transmitted to the control center 50, the camera abnormality signal may be transmitted by a so-called contact signal system in which the abnormality issuing unit 111 and the control center 50 are directly connected by a signal line and the connection is turned ON and OFF. In this case, in addition to a configuration in which the camera abnormality signal is issued using one signal line, a configuration in which an abnormal camera can be specified using a plurality of signal lines may be employed.

In addition, in FIG. 7, the camera abnormality signal is transmitted to the control center 50 via the network 40, but may be transmitted from the elevator operation management system 100 to the control center 50 via the elevator control system 200.

Note that the camera abnormality signal may be transmitted not only to the control center 50 in the building but also to an external elevator monitoring center or the like.

[7. Other Modifications]

Furthermore, the load sensor that detects the load of the car is used as the sensor used in a case where the camera image cannot be acquired in the embodiment described above, but other sensors may be used. For example, in an abnormal case where the image of the landing camera 30 cannot be acquired, the number of waiting people at the landing may be predicted by using the detection status of people by an infrared sensor installed at the landing, a count value of the number of people by a sensor provided in a gate installed at the landing, and the like.

Moreover, the number of waiting people is calculated for each floor as the number of people waiting at the landing in the embodiment described above, but a more finely divided place may be set as a measurement target place where the number of people at the landing or the like is measured. Specifically, a plurality of the landing cameras 30 may be installed at the landing on each floor, the measurement target place of the landing on one floor may be divided into two locations, that is, a location close to the doors of the cars of one group and a location close to the doors of the cars of the other group, and the number of waiting people may be individually measured for each location. In this way, it is possible to perform a process of preferentially allocating the car in the location close to the place where there are more users according to the waiting status in each place.

In addition, the present invention is not limited to the embodiment described above, and includes various modifications. For example, the above embodiment has been described in detail in order to simply describe the present invention, and is not necessarily limited to those including all the configurations and processes described. For example, the order of performing the respective steps illustrated in the flowcharts of FIGS. 2, 3, 4, and 6 is an example, and the order of performing the process may be changed or some processes may be omitted.

In addition, some or all of the configurations, functions, processing units, processing means, and the like, which have been described above, may be implemented with hardware, for example, by designing with an integrated circuit. Further, the configurations, functions, and the like, which have been described above, may be implemented with software by a processor interpreting and executing a program for executing each function. Information such as a program, a table, and a file for implementing each function can be stored in a recording device such as a memory, a hard disk, and a solid state drive (SSD), or a recording medium such as an IC card, an SD card, and a DVD.

Furthermore, the control lines and information lines that are considered to be necessary for the description are illustrated, and all the control lines and the information lines on the product are not necessarily illustrated. In practice, it may be considered that almost all the configurations are connected to each other.

REFERENCE SIGNS LIST

10 Transmission path
20 In-car camera
30 landing camera
40 Network
50 Control center
100 Elevator operation management system
101 Reception unit
102 Learning unit
103 Camera abnormality determination unit
104 Number-of-people-on-each-floor prediction unit
105 Landing/in-car-number-of-people setting unit
106 Comprehensive evaluation unit
107 User-elevator-car allocation command unit
111 Abnormality issuing unit
200 Elevator control system

The invention claimed is:

1. A number-of-people information acquisition system, comprising:
a camera that captures a measurement target place;
a reception unit that receives an image captured by the camera;
a number-of-people setting unit that calculates a number of people in the measurement target place based on an image received by the receiving unit;
an allocation command unit that allocates a car according to the number of people in the measurement target place calculated by the number-of-people setting unit; and
an abnormality determination unit that determines an abnormality of the camera or a transmission path based on a reception status of an image in the reception unit, wherein
when the abnormality determination unit determines an abnormality, the number-of-people setting unit refers to a detection value of a sensor installed in the car or the measurement target place to calculate the number of people.

2. The number-of-people information acquisition system according to claim 1, further comprising:
a learning unit that learns a number of people in an operation status of the car from an image received by the reception unit or a number of people calculated based on the image; and
a number-of-people prediction unit that refers to a learning result of the learning unit to predict a number of people in the measurement target place, wherein when the abnormality determination unit determines an abnormality, the number-of-people setting unit refers to the number of people predicted by the number-of-people prediction unit to calculate the number of people in the measurement target place.

3. The number-of-people information acquisition system according to claim 2, wherein
a camera that captures inside of a car and a camera that captures a landing of the car are prepared as a camera that captures the measurement target place,
when an abnormality of the camera that captures the inside of the car is determined based on a reception status of an image in the reception unit, the number-of-people setting unit refers to a detection value of a load sensor installed in the car to calculate a number of people in the car, and
when the abnormality determination unit determines an abnormality of the camera that captures the landing, the number-of-people setting unit refers to a number of people predicted by the number-of-people prediction unit to calculate a number of people at the landing.

4. The number-of-people information acquisition system according to claim 1, wherein
a camera that captures the measurement target place is a camera that captures inside of a car,
the sensor is a load sensor installed in a car,
the reception unit receives information regarding opening and closing of a door installed in a car, and
when the abnormality determination unit determines that the camera that captures the inside of the car is normal, the reception unit detects that the door is open based on the information regarding opening and closing of the door installed in the car, and when a number of people calculated by the number-of-people setting unit based on an image captured by the camera that captures the inside of the car changes and a detection value of the load sensor changes, the number of people calculated by the number-of-people setting unit based on the image captured by the camera that captures the inside of the car is set as a number of people in the car.

5. The number-of-people information acquisition system according to claim 1, wherein
in a case where the reception unit cannot receive an image captured by the camera for a specified time and in a case where the reception unit cannot receive an image captured by the camera continuously a plurality of times, the abnormality determination unit determines that an abnormality occurs in the camera or a transmission path.

6. The number-of-people information acquisition system according to claim 1, further comprising
an abnormality issuing unit that issues a camera abnormality signal to a predetermined terminal device when the abnormality determination unit determines an abnormality of the camera.

7. A number-of-people information acquisition method, comprising:
a capturing process of capturing a measurement target place using a camera;
a reception process of receiving an image captured by the camera;
a number-of-people determination process of calculating a number of people in the measurement target place based on an image received in the reception process;

an allocation process of allocating a car according to the number of people in the measurement target place calculated in the number-of-people determination process; and an abnormality determination process of determining an abnormality of the camera or a transmission path based on a reception status of an image in the reception process, wherein when an abnormality is determined in the abnormality determination process, the number-of-people determination process refers to a detection value of a sensor installed in the car or the measurement target place to calculate the number of people.

8. The number-of-people information acquisition method according to claim 7, further comprising:

a learning process of learning calculation of a number of people in an operation status of the car from an image received in the reception process or a number of people calculated based on the image; and a number-of-people prediction process of referring to a learning result of the learning process to predict a number of people in the measurement target place, wherein when an abnormality is determined in the abnormality determination process, the number-of-people determination process refers to the number of people predicted in the number-of-people prediction process to calculate the number of people in the measurement target place.

9. An elevator comprising:

an in-car camera that is installed in a car and captures inside of the car;

a reception unit that receives an image captured by the in-car camera;

a number-of-people setting unit that calculates a number of people in a car based on an image received by the receiving unit;

an allocation command unit that allocates a car according to the number of people determined by the number-of-people determination unit; and an abnormality determination unit that determines an abnormality of the in-car camera or a transmission path based on a reception status of an image captured by the in-car camera in the reception unit, wherein when the abnormality determination unit determines an abnormality, the number-of-people setting unit refers to a detection value of a load sensor installed in the car to calculate the number of people in the car.

10. The elevator according to claim 9, further comprising:

a landing camera that captures a landing;

a learning unit that learns a number of people in an operation status of the car from an image received by the reception unit or a number of people calculated based on the image; and a number-of-people prediction unit that refers to a learning result of the learning unit to predict a number of people at the landing, wherein when the abnormality determination unit determines an abnormality, the number-of-people setting unit refers to the number of people predicted by the number-of-people prediction unit to calculate the number of people at the landing.

* * * * *